No. 805,232. PATENTED NOV. 21, 1905.
R. H. RICE.
SHAFT COUPLING.
APPLICATION FILED APR. 24, 1905.

Witnesses:

Inventor,
Richard H. Rice,
By Albert G. Davis
Att'y.

UNITED STATES PATENT OFFICE.

RICHARD H. RICE, OF LYNN, MASSACHUSETTS, ASSIGNOR TO GENERAL ELECTRIC COMPANY, A CORPORATION OF NEW YORK.

SHAFT-COUPLING.

No. 805,232.     Specification of Letters Patent.     Patented Nov. 21, 1905.

Application filed April 24, 1905. Serial No. 257,162.

*To all whom it may concern:*

Be it known that I, RICHARD H. RICE, a citizen of the United States, residing at Lynn, county of Essex, State of Massachusetts, have invented certain new and useful Improvements in Shaft-Couplings, of which the following is a specification.

The present invention relates to couplings for transmitting angular motion from one shaft to another located in axial alinement, or substantially so.

Many kinds of machinery require a coupling for uniting separate shafts. In addition to compensating for any slight lack of alinement these couplings should in some cases permit the shafts to have a restricted amount of relative endwise movement. This is particularly true where an electric generator is directly connected to a turbine. In the case of the generator a certain amount of endwise movement of the shaft is desirable to prevent the brushes from wearing grooves in the contacting surfaces. With the turbine this endwise movement is highly objectionable, because the relatively movable parts are usually so positioned that a change means either that the more delicate parts will rub, and thus be injured, or the leakage through the clearance will be excessive, or both.

The present invention has for its object to provide a simple yet rugged shaft-coupling which will fulfil the conditions above specified and this with a minimum amount of wear.

Figure 1:
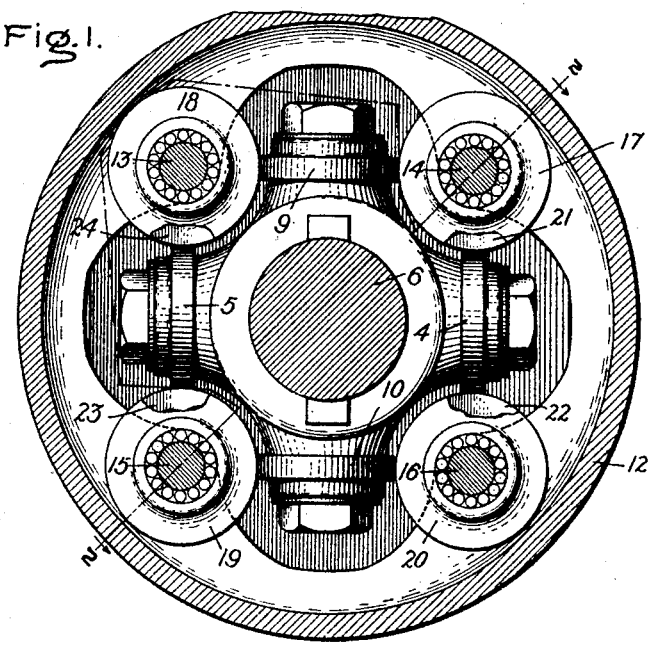
Figure 2:
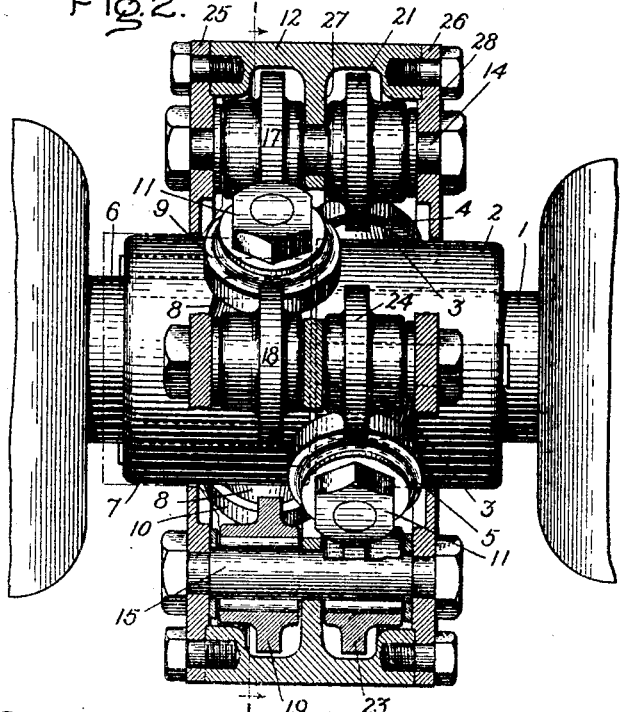

In the accompanying drawings, which illustrate one embodiment of my invention, Figure 1 is a transverse section of a coupling, taken on line 1 1 of Fig. 2; and Fig. 2 is a view, partly in elevation and partly in section, the said section being taken on line 2 2 of Fig. 1.

Keyed or otherwise secured on the end of the shaft 1, which may represent the driving or the driven shaft, is a head 2, carrying a plurality of radial studs or projections 3, which carry rollers 4 and 5. In the present instance two studs are shown displaced one hundred and eighty degrees; but the number can be changed, if desired. Keyed or otherwise secured on the end of the other shaft 6, which may be the driving or the driven shaft, is a head 7, similar to the head 2. It is provided with as many studs or projections 8 as the head 2, which carry rollers 9 and 10. When the shafts are properly alined, the studs thereon form a cross, as in Fig. 1; but two of the studs are located in a plane back of the others. In other words, the studs on the heads when viewed in an axial direction alternate—that is to say, the studs on one head are ninety degrees ahead with respect to those on the other head. All of the rollers are easily detached, being held on the studs by nuts 11. Surrounding the parts of the coupling above described and revolving with them is a drum 12, which carries four spindles 13, 14, 15, and 16, assuming that the heads each have two studs or projections. On each one of these spindles are mounted two rollers, one in front of the other, making eight in all. Of these rollers four are in rolling contact with the two rollers carried by one head and four with the two rollers carried by the other head. For example, the drum-rollers 17 and 18 are in engagement with the left-hand head-roller 9, Fig. 2, and the drum-rollers 19 and 20 are in contact with the left-hand head-roller 10, which is displaced by one hundred and eighty degrees from roller 9. The right-hand drum-rollers 21 and 22, Fig. 1, are in engagement with the head-roller 4 and the drum-rollers 23 and 24 are in engagement with the head-roller 5.

The sides of the drum are closed in by plates or heads 25 and 26, that are bolted to the rim of the drum. In some instances the drum may form a pulley or a gear to transmit power. The fixed spindles 13, 14, 15, and 16 of the drum are supported by the heads and are held in place by nuts. Midway of the sides of the drum and extending circumferentially on the inside thereof is a web 27, that serves to support the spindles between their ends and also to prevent endwise movement of the rollers thereon. Each of the rollers is or may be provided with roller-bearings, so as to reduce friction and wear as much as possible. In addition each roller is provided with an elongated hub or other means for holding it in a given position. One or more hardened washers 28 may also be employed.

The action of the coupling is as follows: Assuming that shaft 1 is out of its true position—in other words, is slightly eccentric with respect to shaft 6—the drum-rollers will turn or roll slightly on the head-rollers and compensate for such eccentricity. On the other hand, assume that the shaft 1 is moving to and fro in an endwise direction. The head-rollers will turn or roll slightly on the drum-rollers and compensate therefor. The action of the other portion of the coupling is identical, and therefore need not be described in detail. One shaft cannot move angularly with respect to the other, because of the engagement of the eight drum-rollers with the four head-rollers. It is to be noted that the axis of rotation of the head-rollers is at right angles to the shaft, while the axis of rotation of the drum-rollers is parallel with the shaft. It is evident that if the two shafts instead of being in the same straight line are at a slight angle to each other the coupling will still continue to operate satisfactorily, because the rollers are free to turn one upon the other.

The coupling may be lubricated in any suitable way, such as by means of an oil-carrying pipe discharging into the interior of the drum.

It is to be noted that the drum is closed at all points except around the shaft, where the lubricant would enter. Hence only a limited amount of lubricant is required.

In taking the coupling apart the nuts are removed from the drum-spindles 13, 14, 15, and 16. Then the stud-bolts holding the plates or heads 25 are removed, then the heads 25, and finally the rollers. The heads can be slipped back on the shafts and the spindles removed, if desired. This is a very desirable construction, since it permits the coupling to be taken apart without interfering in any way with the mechanism connected to the two shafts.

It is to be noted that with the construction shown the longitudinal or axial movement of one set of rollers causes a turning movement of the other set of rollers about their axes, and in this way the friction is reduced to a minimum. No matter which way a shaft tends to move its action is accompanied by a turning action of at least one set of rollers.

In accordance with the provisions of the patent statutes I have described the principle of operation of my invention, together with the apparatus which I now consider to represent the best embodiment thereof; but I desire to have it understood that the apparatus shown is only illustrative and that the invention can be carried out by other means.

What I claim as new, and desire to secure by Letters Patent of the United States, is—

1. In a coupling, the combination of a pair of shafts, rollers mounted on the shafts in such manner that their axes are at right angles to those of the shafts, a drum or support surrounding the shafts, and rollers carried by the drum, which engage with the shaft-rollers.

2. In a coupling, the combination of a pair of shafts, rollers mounted on the shafts in such manner that their axes are at right angles to those of the shafts, a drum or support surrounding the shafts, rollers carried by the drum, which engage with the shaft-rollers, and spindles for the drum-rollers which extend parallel to the normal axes of the shafts.

3. In a coupling, the combination of a pair of shafts, heads carried thereby which are provided with radial studs, rollers mounted thereon, a drum or carrier which surrounds the shafts, rollers mounted on the drum, which engage with and turn on the shaft-rollers, and a plurality of spindles carried by the drum upon which the rollers are mounted.

4. In a coupling, the combination of two abutting shafts, a drum, one set of rollers carried by the shafts, a second set of rollers carried by the drum, the number of rollers carried by the drum exceeding that carried by the shafts, and pivots for the rollers which permit them to engage and turn on each other.

5. In a coupling, the combination of two abutting shafts, a drum surrounding the adjacent ends of the shafts, heads located at the ends of the drum, spindles supported by the heads, rollers carried by the spindles, and other rollers carried by the shafts and extending between and engaging the rollers on the drum.

6. In a coupling, the combination of two abutting shafts carrying radially-extending studs, rollers mounted thereon, a drum surrounding the shafts, an internal circumferential web on the drum and located between the ends, spindles extending parallel with the shaft-axes and passing through the web, rollers on the spindles turning on those carried by the shafts, and heads for supporting the ends of the spindles.

7. In a coupling, the combination of two shafts, rollers carried by each of the shafts, and means causing the rollers to turn slightly as the shafts move endwise with respect to each other.

8. In a coupling, the combination of two shafts, a means for uniting the shafts which is provided with rollers, and means carried by the shafts which causes the rollers to turn slightly as the shafts revolve while out of alinement.

9. In a coupling, the combination of a pair of shafts located end to end, rollers carried by the shafts, and other rollers carried by a support which engage with and roll or turn on the first-mentioned rollers to compensate for changes in position of the shafts.

10. In a coupling, the combination of a pair of shafts located end to end, a set of rollers carried by each shaft, the said rollers occupying different transverse planes, a drum surrounding the shafts, rollers mounted on the drum and arranged in pairs, the members of each pair engaging with and turning on rollers mounted on the separate shafts, spindles for the rollers, and a means for holding the drum-rollers a fixed distance apart.

In witness whereof I have hereunto set my hand this 21st day of April, 1905.

RICHARD H. RICE.

Witnesses:
JOHN A. MCMANUS, Jr.,
ALEX. F. MACDONALD.